Oct. 25, 1949.  T. SLONCZEWSKI  2,485,931
MAGNETIC FIELD STRENGTH INDICATOR
Filed April 20, 1943
2 Sheets-Sheet 1

INVENTOR
T. SLONCZEWSKI
BY
G. H. Heydt
ATTORNEY

Oct. 25, 1949.  T. SLONCZEWSKI  2,485,931
MAGNETIC FIELD STRENGTH INDICATOR
Filed April 20, 1943  2 Sheets-Sheet 2

(FREQUENCIES $F_1$, $F_2$ & $F_3$ ARE ALL DIFFERENT.)

INVENTOR
T. SLONCZEWSKI
BY
G. H. Hewitt.
ATTORNEY

Patented Oct. 25, 1949

2,485,931

UNITED STATES PATENT OFFICE 2,485,931

MAGNETIC FIELD STRENGTH INDICATOR

Thaddeus Slonczewski, Glenwood Landing, N. Y., assignor to Bell Telephone Laboratories, Incorporated, New York, N. Y., a corporation of New York Application April 20, 1943, Serial No. 483,756

9 Claims. (Cl. 175—183)

This invention relates to the measurement of magnetic field strength and more particularly is directed to the direct indication of the absolute strength of a magnetic field.

It is a well-known fact that the earth's magnetic field over any given limited area is substantially uniform except that this uniformity may suffer distortion in the presence of paramagnetic or diamagnetic materials. This distortion usually results in a change in both the direction and absolute intensity of the field. In most cases the paramagnetic or diamagnetic body which produces the magnetic distortion is located at a considerable distance from the field strength measuring or indicating device and if the distorting material is to be detected, the measuring or indicating device must be highly sensitive and well compensated against extraneous influences.

It is the object of this invention to provide a measuring and indicating system capable of measuring the absolute field strength of a magnetic field or changes in its strength, independent of extraneous influences or changes in the direction of the magnetic field.

It is a further object of this invention to provide a measuring and indicating system containing no moving parts in its detecting unit which is substantially free of all spurious influences and the measurements of which are independent of the direction taken by the field.

The foregoing objects are achieved by this invention which comprises in combination three stationary magnetometer units having their principal magnetic axes mutually perpendicular, windings for each of these magnetometers, means for exciting these windings with a voltage of fundamental frequency whereby voltages of second harmonic frequency are induced in each of the magnetometers of magnitudes proportional, respectively, to the direction cosine of the angle formed by the principal axis of each magnetometer and the direction of the magnetic field, means for squaring each of the second harmonic voltages, means for adding together the resulting squared second harmonic currents, and means for indicating the sum of said currents.

The invention may be better understood by referring to the accompanying drawings in which:

Fig. 1 schematically discloses three magnetometers with their principal axes mutually perpendicular and each forming an angle with the direction of a magnetic field;

Fig. 2 discloses one means of mounting the magnetometers shown in Fig. 1;

Figure 1:
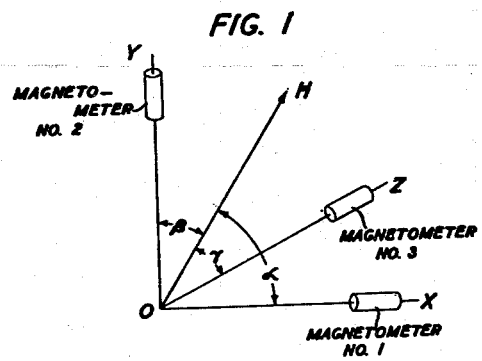

Referring now more particularly to Fig. 1 wherein are shown the three magnetometers with their principal axes mutually disposed perpendicular with each other. These magnetometers are shown for purposes of description with their principal axes corresponding with the three principal axes employed with rectangular Cartesian coordinates and are designated the X, Y and Z axes, respectively. The magnetic field is indicated as a vector H passing through the origin 0 and forming angles with each of the three coordinate axes. In Fig. 1 the angle formed with the X axis is shown as $\alpha$, the angle formed with the Y axis as $\beta$ and the angle formed with the Z axis as $\gamma$.

These magnetometers comprise essentially a length of low retentivity magnetic material, preferably of high permeability and upon which one or more windings are wound. It has been discovered that when the magnetic field is at right angles to the principal axis of the core and the winding be excited by a voltage of fundamental frequency, no even harmonics will be generated in the winding. On the contrary, if the magnetic field has a component in the direction of the principal axis of the core and the winding be excited by a voltage of fundamental frequency, even order harmonic voltages will be generated therein. The magnitude of these harmonic voltages will each be proportional to the cosine of the angle formed by the principal axis of the magnetometer and the direction of the magnetic field. While any one of these harmonics can be used, the second harmonic is selected for illustrative purposes.

It can be shown matthematically that the sum of the squares of these three second harmonic voltages is entirely independent of the orientation of the three magnetometers with respect to the dirction of the magnetic field providing the three magnetometers retaining their mutual perpendicular relationship and they are equally sensitive. It can also be shown that the square root of the sum of the squares of these second harmonic voltages is proportional to the absolute strength of the magnetic field and likewise independent of the orientation of the magnetometers with respect to the direction of the magnetic field. It is upon this fundamental principle that this invention is based. Mathematically the relationships just stated may be expressed as follows:

$$I_1 = K^2H^2 (\cos^2\alpha + \cos^2\beta + \cos^2\gamma) = K_1H^2 \quad (1)$$

where $I_1$ is the sum of the three squared magnetometer currents.

$K_1 = K^2$ is a proportionality constant. (K must be effectively the same for all three magnetometers.)

H is the absolute magnitude of the magnetic field vector.

Equation 1 above expresses the fundamental fact that for the magnetometer structure described above, the sum of the three squared magnetometer currents will be equal to the product of the proportionality constant $K_1$ and the absolute magnitude of the magnetic field strength H. It is obvious, of course, that the indicating instrument which responds to the current $I_1$ may either be calibrated to indicate the square root of this current, or in the alternative may have its response characteristic so modified as to indicate the square root of this current on a linear scale. In either case the indication I would be directly proportional to the absolute magnitude of the magnetic field vector H. With the indicating instrument or scale so modified the following expression will obtain:

$$I = \sqrt{I_1} = KH \quad (2)$$

It is evident that the scale of this instrument may have inscribed directly thereon the magnetic field strength in suitable units.

Figure 2:
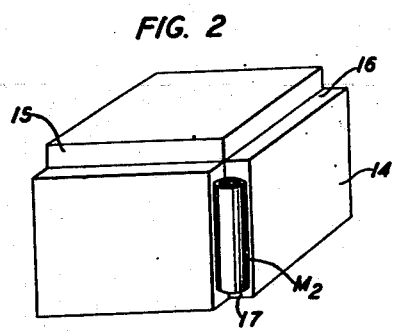

The three magnetometers shown in Fig. 1 may be mounted by any suitable means so that their principal axes are mutually perpendicular. One such means is shown in Fig. 2. The supporting structure should be of non-magnetic material and in this figure a block in the form of a cube 14 is formed from a suitable non-magnetic plastic. Along three adjacent edges of this cube there are grooved portions 15, 16 and 17 adapted to receive the three magnetometer units. In Fig. 2 groove 17 is shown holding magnetometer $M_2$. The other two magnetometers are not shown but are mounted in grooves 15 and 16, respectively. Any suitable means may be used for securing the magnetometers in position provided it is composed of non-magnetic material. Two of the grooves may contain a suitable non-magnetic adjusting means for correcting for inaccuracies of manufacture whereby the three magnetometers may be very accurately aligned in the three mutually perpendicular axes. A specific adjusting means is not disclosed. However, it may take any form, such as, for example, adjusting screws made from non-magnetic material or shims of non-magnetic sheet material.

Figure 3:
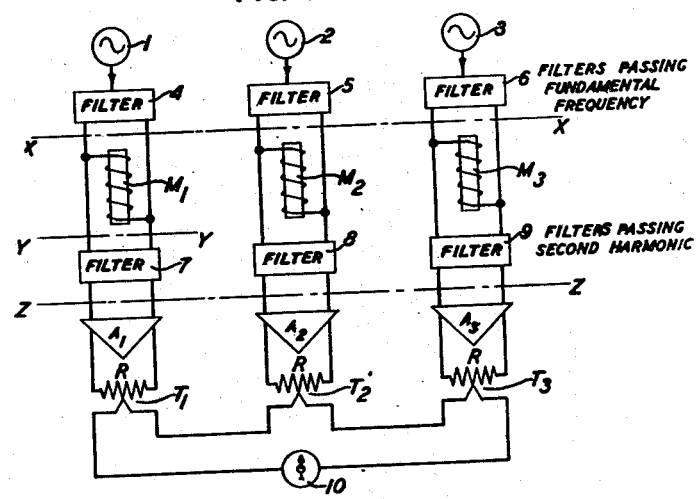
Fig. 3 is a block diagram showing schematically one embodiment of this invention.

The physical connections of the windings for magnetometer $M_2$ are not shown in Fig. 2 but schematically they are disclosed in Fig. 3. The system shown in Fig. 3 comprises the three magnetometers $M_1$, $M_2$ and $M_3$ each having wound on its magnetic core a single winding.

While the three magnetometers are shown parallel in Fig. 3 for schematic purposes, they are in actual fact mutually disposed perpendicular with each other as previously described. Each of these magnetometers is excited with a voltage of fundamental frequency from its associated oscillator 1, 2 or 3. Filters for passing only the fundamental frequency are provided as filters 4, 5 and 6, respectively. The frequencies of these three oscillators may be the same or they may be different and they may or may not be harmonically related.

Associated in circuit with magnetometers $M_1$, $M_2$ and $M_3$ are also filters 7, 8 and 9, respectively. These three filters are adapted to pass only the second harmonic of the respective channels. It is to be remembered that each of the magnetometers receives an exciting voltage of fundamental frequency from its associated oscillator and that its second harmonic output is proportional to the product of the absolute field strength and the direction cosine of the angle formed by the principal axis of the magnetometer and the direction of the magnetic field. The second harmonic voltages leaving the three magnetometers are passed freely by the second harmonic filters 7, 8 and 9, respectively, and are amplified by their associated amplifiers $A_1$, $A_2$ and $A_3$. The current output of each of these amplifiers is proportional to its second harmonic voltage input and is passed through a heater resistor R of a thermocouple. For example, the output of amplifier $A_1$ is applied to the heater resistor R of thermocouple $T_1$, the output of amplifier $A_2$ to thermocouple $T_2$ and the output of amplifier $A_3$ to thermocouple $T_3$. In this connection it may be noted that should the inherent sensitivities of the magnetometers be unequal, and they usually are slightly different, their effective sensitivities represented by the constant K may be made equal by properly adjusting the gain of the three amplifiers $A_1$, $A_2$ and $A_3$.

In each of these thermocouple units the heat generated is proportional to the square of the current output from its associated amplifier. The voltage response of the thermocouple in each case is proportional to the square of the current supplied to its heater and consequently to the square of the second harmonic output voltage from its associated magnetometer. The output voltages of the three thermocouples are added together in a series network including a suitable indicator 10. If this indicator, as previously stated, is calibrated to read the square root of the sum of these voltages it will indicate directly the absolute magnitude of the magnetic field as previously discussed in connection with expressions 1 and 2 above.

Figure 4:
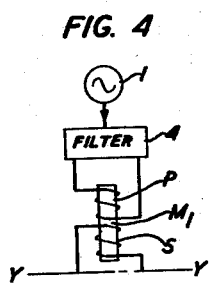
Figs. 4 and 5 show alternative forms of magnetometers which may be used in the practice of this invention and which may be substituted for the magnetometers shown in Fig. 3.

Each of the magnetometers as shown in Fig. 3 has wound thereon a single winding which serves both as the exciting winding and as the second harmonic output winding. Separate windings, however, may be used for these purposes as shown in Fig. 4 wherein magnetometer $M_1$ is shown with a primary winding P and a secondary winding S. The primary winding P acts as the exciting winding receiving the current of fundamental frequency from its oscillator 1 through the filter 4. The secondary winding S has induced therein not only a voltage of fundamental frequency, but also a voltage of second harmonic frequency proportional to the angle formed by the magnetometer with the magnetic field. As shown in Fig. 3 the second harmonic output of magnetometer $M_1$ is passed through filter 7 to amplifier A₁. The fundamental frequency voltages induced in the secondary S of magnetometer M₁ of Fig. 4 are rejected by filter 7 and only the second harmonic voltages are passed. The form of magnetometer shown in Fig. 4 may be substituted for the single winding type shown in Fig. 3 without in any way affecting the operation of the invention.

Figure 5:
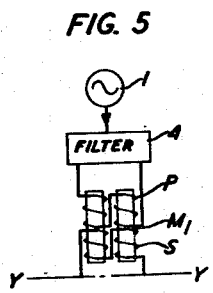

Instead of using a single magnetometer core, each of the magnetometers may contain not only two windings, but also two cores as shown in Fig. 5 and the remarks relative to Fig. 4 apply equally to Fig. 5. It should also be noted that the secondary winding S of Fig. 5 may be dispensed with and connections made directly to the terminals of the primary winding for connection to the associated second harmonic filter, for example filter 7 of Fig. 3.

Figure 6:
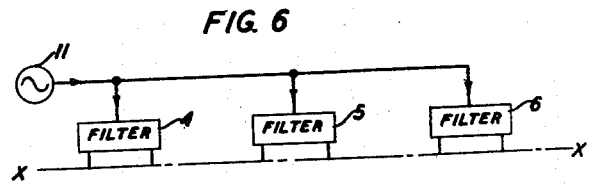
Fig. 6 shows how one alternating current source may be utilized to excite all three magnetometers.

If it is desired to excite all three windings with the same frequency, a single oscillator, such as oscillator 11, shown in Fig. 6 may be employed. In this case, filters 4, 5 and 6, passing only the fundamental frequency serve two functions instead of only one. Referring again for a moment to Fig. 3, it should be noted that at the terminals of each of the magnetometers there appears a voltage of second harmonic frequency and that by reason of using separate oscillators 1, 2 and 3 the three channels are thoroughly isolated so the second harmonic voltage from one channel is not transmitted to the other channel to cause an error in reading. However, when using a single oscillator as shown in Fig. 6 these second harmonic voltages could be transmitted from one channel to the other by way of the oscillator output leads. Fundamental frequency filters 4, 5 and 6, however, prevent the passage of any second harmonic currents through the exciting circuit. The single oscillator arrangement of Fig. 6 may be substituted directly for the three oscillators of Fig. 3 without in any way affecting the operation of the circuit.

Figure 7:
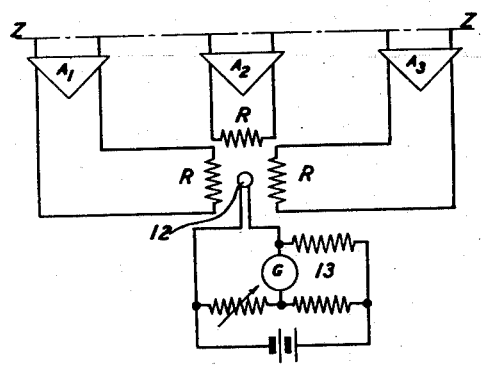
Fig. 7 is an alternative form of indicator for the system shown in Fig. 3.

If it is desired to have the apparatus indicate only changes in the strength of the magnetic field as, for example, carrying the apparatus in an airplane over a land terrain to detect the presence of various mineral deposits or carrying it over water to detect the presence of a submarine, the circuits of Fig. 7 may be employed. It may be here stated that the thermocouples shown in Fig. 3 may instead be thermally responsive resistors, such as thermistors. Such a resistor is shown schematically as thermistor 12 in Fig. 7. The outputs of the three amplifiers A₁, A₂ and A₃ are fed to three heater units R, R and R. Thermistor 12 is responsive to the sum of the heats generated by each of these heating units and is included in a bridge network 13 of the well-known Wheatstone bridge form. One or more of the resistors of this bridge network may be made adjustable for purposes of initial balancing and it is evident that so long as the absolute strength of the magnetic field does not change, the bridge will remain balanced and the galvanometer G will show no indication. Should, however, the magnetic field strength vary up or down, the sum of the heats produced by the three heaters R, R and R will correspondingly vary to change the resistance of thermistor unit 12. This results in an unbalance of the bridge network 13 and an indication thereof in one direction or the other by galvanometer G. With such a balancing feature the galvanometer G may be made very sensitive and may give a large response for a very small change in magnetic field strength. It is obvious that instead of using only a direct current galvanometer G, the bridge may be excited with alternating current and an amplifier-detector may be inserted between the bridge output terminals and the galvanometer as is conventional in bridge practice.

Figure 8:
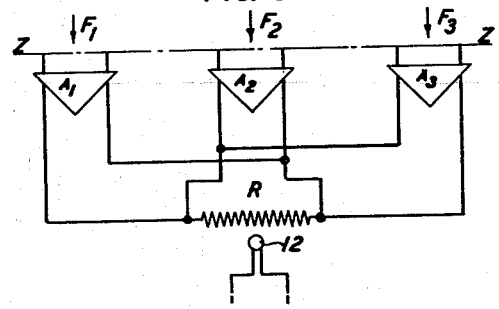
Fig. 8 is another alternative form of indicating system where the frequencies used in exciting the magnetometers are all different.

Instead of using a thermistor 12 with three heaters, the thermistor may have only one heater R as shown in Fig. 8. In this case, however, three separate oscillators must be used as shown in Fig. 3 each having different frequencies. The second harmonics of these three frequencies are indicated as frequencies F₁, F₂ and F₃ in Fig. 8. The output of thermistor 12 in Fig. 8 may go to a bridge network as shown in Fig. 7 or may lead to an indicating instrument 10 as shown in Fig. 3. It is obvious, of course, that amplification may be employed with the indicating instrument 10 of Fig. 3 or with galvanometer G of Fig. 7.

Figure 9:
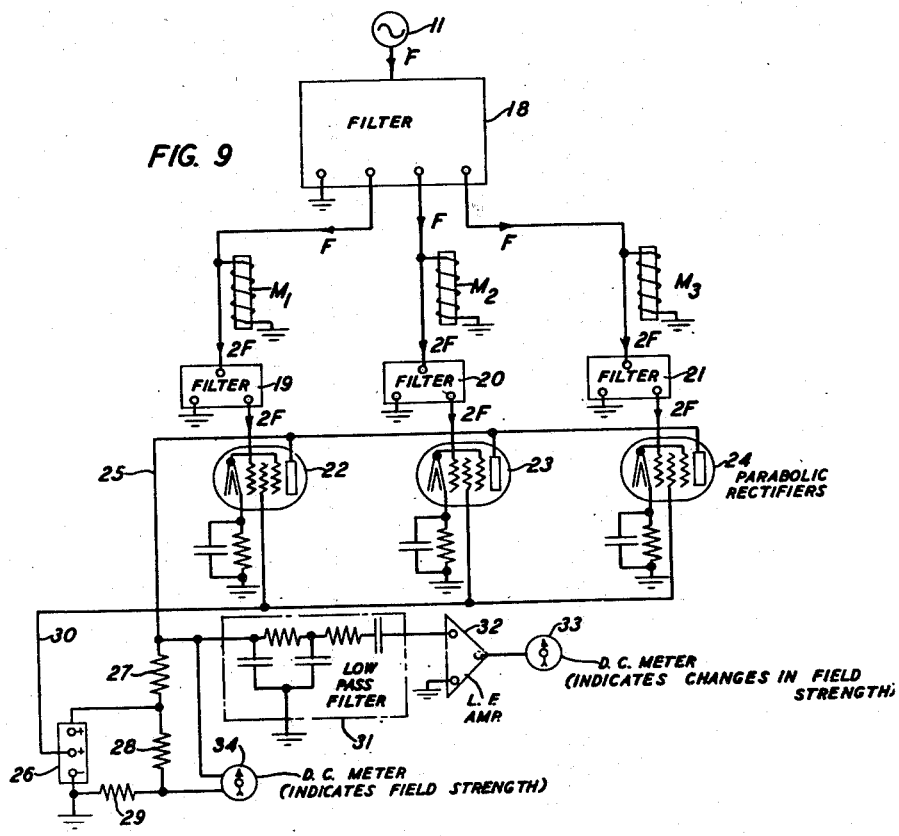
Fig. 9 discloses another embodiment of the invention employing a fundamentally different form of squaring means.

Fig. 9 shows a complete system embodying this invention wherein squaring is produced by means of parabolic rectifiers instead of by means of employing the heating effect of an electric current. In this figure an oscillator 11 produces a voltage of fundamental frequency which actually may contain a number of harmonics. The output of this oscillator is supplied to magnetometers M₁, M₂ and M₃ through a filter unit 18 which combines the functions of filters 4, 5 and 6 of Figs. 3 and 6. This filter passes only the voltage of fundamental frequency to excite the windings of magnetometers M₁, M₂ and M₃ and will reject any higher harmonic voltages induced in one magnetometer which may attempt to pass to another magnetometer channel through the exciting circuit. The induced voltages of second harmonic frequency for magnetometers M₁, M₂ and M₃ are passed by way of filters 19, 20 and 21, respectively, to the control grids of three parabolic rectifiers 22, 23 and 24, respectively. These parabolic rectifiers are of conventional form and are adapted to produce output currents proportional to the square of the input voltages. Direct current is supplied to the plates of these three rectifiers from a suitable direct current source 26 through resistor 27 and conductor 25, the return path being made through their respective cathode resistors and ground. A suitable screen grid voltage is supplied to the screen grids of each of the tubes by way of conductor 30 from direct current source 26.

As previously stated, the rectified outputs of these three tubes is each proportional respectively to the square of the second harmonic input voltages applied to their respective control grids and are added by means of the common conductor 25 which is connected to each of the three plates. This rectified output current will appear as a voltage across resistor 27. In order to balance out the normal space current of tubes 22, 23 and 24, a network comprising two series-connected resistors 28 and 29 is connected across direct current source 26. These two resistors are so proportioned in value that the voltage drop appearing across resistor 28 is exactly equal to the average total space current drop in resistor 27. This results in a zero indication of direct current meter 34 so long as the field strength remains zero. The effect of a zero field strength may be artificially produced by disconnecting momentarily the three magnetometers from filters 19, 20 and 21, respectively, or by disconnecting oscillator 11. When reestablishing these connections, however, the rectified outputs of the parabolic rectifiers will appear as rectified components superimposed upon the normal space currents of these tubes. This will act to increase the voltage drop across resistor 27 and consequently appear as an indication on meter 34. Meter 34 is thereupon caused to respond proportionally to the sum of the squares of the three second harmonic outputs of the three magnetometers $M_1$, $M_2$ and $M_3$, respectively. By suitable calibration as previously explained, this instrument may be caused to indicate directly the absolute magnitude of the field strength.

The circuit of Fig. 9 may also be caused to indicate the changes in the field strength as in some applications of the invention, for example, in submarine detection, the absolute magnitude of the field strength is relatively unimportant and it is only the change in the field strength which it is desired to observe. For a plane flying a fixed distance above the surface of the water or ground and flying at a predetermined velocity, these changes in the field strength will be produced at a rate corresponding with a relatively low frequency band. In order to indicate these variations, the voltage changes appearing across resistor 27 are applied to a low-pass filter comprising resistance and capacity elements as shown in the dotted rectangle 31 of Fig. 9. It is evident that frequency changes of relatively high order will be effectively attenuated by this filter network and only frequencies of a relatively low order will pass through. Also, the steady-state voltages of frequency 2F coming from the magnetometers as well as any harmonics thereof are also attenuated. The output of this filter is passed through a low frequency amplifier 32 which is insensitive to very slow changes of field strength as, for example, those due to the gradual change of the absolute strength of the field from one point on the earth's surface to another, and is also insensitive to relatively high frequency changes. Amplifiers having this low frequency band characteristic are well known in the art and need be described no further. The output of this amplifier is fed to a direct current meter 33. It is evident that so long as the absolute strength of the magnetic field remains unchanged there will be no variation in the voltage appearing across resistor 27 and consequently no input will be applied to amplifier 32 and the indicator of meter 33 will indicate zero. Should there, however, be a momentary change in the absolute field strength this will result in a change in the voltage appearing across resistor 27 and if of proper frequency this will be transmitted to the input circuits of amplifier 32, amplified, and passed on to meter 33 resulting in a deflection.

If sufficient amplification is not provided by the parabolic rectifiers 22, 23 and 24, additional amplification may be provided for meter 34 by merely inserting a suitable amplifier between meter 34 and the extreme terminals of resistors 27 and 28. Also, by way of further modification, it is evident that instead of using one oscillator 11 as shown in Fig. 9, the exciting voltages of fundamental frequency may be provided by means of the three oscillators and their associated filters as shown in Fig. 3. Furthermore, it is obvious that any one of the other even order harmonics generated in the magnetometers can be substituted for the second harmonic.

What is claimed is:

1. A system for indicating the field strength of magnetism comprising in combination three magnetometer cores of magnetic material having their principal magnetic axes mutually perpendicular, windings for each core, a source of alternating current connected to windings of each magnetometer whereby second harmonic voltages are produced therein of magnitudes proportional respectively to the product of the field strength and the direction cosine of the angle formed between the principal axis of each core and the direction of the magnetic field, an electric squaring means responsive to all three of said second harmonic voltages for producing a current varying as a function of the sum of their squares, and an indicating means responsive to said produced current whereby the indications are caused to vary as a function of the strength of the magnetic field.

2. A system for indicating the field strength of magnetism comprising in combination three magnetometer cores of magnetic material having their principal magnetic axes mutually perpendicular, windings for each core, a source of alternating current for each of the magnetometers, a filter for each magnetometer connecting windings thereof to the alternating current source, said filters being capable of passing only the voltages of fundamental frequency from the source to their associated windings whereby the windings are excited by voltages of fundamental frequency to produce second harmonic voltages therein of magnitudes proportional respectively to the product of the field strength and the direction cosine of the angle formed between the principal axis of each core and the direction of the magnetic field, an electric squaring means reponsive to all three of said second harmonic voltages for producing a current varying as a function of the sum of their squares, and an indicating means responsive to said produced current whereby the indications are caused to vary as a function of the strength of the magnetic field.

3. A system for indicating the field strength of magnetism comprising in combination three magnetometer cores of magnetic material having their principal magnetic axes mutually perpendicular, windings for each core, a source of alternating current for each of the magnetometers, a filter for each magnetometer connecting windings thereof to the alternating current source, said filters being capable of passing only the voltages of fundamental frequency from the source to their associated windings whereby the windings are excited by voltages of fundamental frequency to produce second harmonic voltages therein of magnitudes proportional respectively to the product of the field strength and the direction cosine of the angle formed between the principal axis of each core and the direction of the magnetic field, an electric squaring means responsive to all three of said second harmonic voltages for producing a current varying as a function of the sum of their squares, a second filter for each magnetometer connecting the said windings to the electric squaring means, said second filters adapted to pass only voltages of second harmonic frequency, and an indicating means responsive to said produced current whereby the indications are caused to vary as a function of the strength of the magnetic field.

4. A system for indicating deviations from a predetermined value of the field strength of magnetism comprising in combination three magnetometer cores of magnetic material having their principal magnetic axes mutually perpendicular, windings for each core, a source of alternating current connected to windings of each of the magnetometers whereby second harmonic voltages are produced therein of magnitudes proportional respectively to the product of the field strength and the direction cosine of the angle formed between the principal axis of each core and the direction of the magnetic field, an electric heating means coupled to each winding to produce heat proportional respectively to the squares of the produced second harmonic voltages, an indicating means comprising a thermally variable resistor responsive to the sum of the heats produced, a Wheatstone bridge network including said resistor as one arm thereof and normally balanced for a predetermined value of field strength, and a balance indicator connected to the bridge responsive in accordance with the degree of unbalance of the bridge, whereby the indications vary as a function of the deviation from a predetermined value of field strength.

5. A system for indicating the field strength of magnetism comprising in combination three magnetometer cores of magnetic material having their principal magnetic axes mutually perpendicular, windings for each core, a source of alternating current connected to windings of each magnetometer whereby second harmonic voltages are produced therein of magnitudes proportional respectively to the product of the field strength and the direction cosine of the angle formed between the principal axis of each core and the direction of the magnetic field, an electric squaring means responsive to all three of said second harmonic voltages for producing a current varying as a function of the sum of their squares, said squaring means comprising three parabolic rectifiers having input and output circuits, said input circuits being connected to the magnetometers for receiving the generated second harmonic voltages and the output circuits being connected in parallel whereby the total output current is the sum of the individual output currents, and an indicating means responsive to said total output current whereby the indications are caused to vary as a function of the strength of the magnetic field.

6. A system for indicating the field strength of magnetism comprising in combination three magnetometer cores of magnetic material having their principal magnetic axes mutually perpendicular, windings for each core, a source of alternating current for each of the magnetometers, a filter for each magnetometer connecting windings thereof to the alternating current source, said filters being capable of passing only the voltages of fundamental frequency from the source to their associated windings whereby the windings are excited by voltages of fundamental frequency to produce second harmonic voltages therein of magnitudes proportional respectively to the product of the field strength and the direction cosine of the angle formed between the principal axis of each core and the direction of the magnetic field, an electric squaring means responsive to all three of said second harmonic voltages for producing a current varying as a function of the sum of their squares, said squaring means comprising three parabolic rectifiers having input and output circuits, the input circuits being connected to the magnetometers for receiving the generated second harmonic voltages and the output circuits being connected in parallel whereby the total output current is the sum of the individual output currents, and an indicating means responsive to said total output current whereby the indications are caused to vary as a function of the strength of the magnetic field.

7. A system for indicating the field strength of magnetism comprising in combination three magnetometer cores of magnetic material having their principal magnetic axes mutually perpendicular, windings for each core, a source of alternating current for each of the magnetometers, a filter for each magnetometer connecting windings thereof to the alternating current source, said filters being capable of passing only the voltages of fundamental frequency from the source to their associated windings whereby the windings are excited by voltages of fundamental frequency to produce second harmonic voltages therein of magnitudes proportional respectively to the product of the field strength and the direction cosine of the angle formed between the princapal axis of each core and the direction of the magnetic field, a second filter connected to each magnetometer, said second filters adapted to pass only voltages of second harmonic frequency, an electric squaring means responsive to all three of said second harmonic voltages for producing a current varying as a function of the sum of their squares, said squaring means comprising three parabolic rectifiers having input and output circuits, said input circuits being connected to the said second filters for receiving the generated second harmonic voltages and said output circuits being connected in parallel whereby the total output current is the sum of the individual output currents, and in indicating means responsive to said total output current whereby the indications are caused to vary as a function of the strength of the magnetic field.

8. A system for indicating the field strength of magnetism comprising in combination three magnetometer cores of magnetic material having their principal magnetic axes mutually perpendicular, windings for each core, a source of alternating current connected to windings of each magnetometer whereby even order harmonic voltages are produced therein of magnitudes proportional respectively to the products of the field strength and the direction cosine of the angle formed between the principal axis of each core and the direction of the magnetic field, a frequency selective network for each of said magnetometers capable of selecting and transmitting one of said even order harmonic voltages, an electric squaring means responsive to all three of said selected even order harmonic voltages for producing a current varying as a function of the sum of their squares, and an indicating means responsive to said produced current whereby the indications are caused to vary as a function of the strength of the magnetic field.

9. The combination in accordance with claim 5 wherein the indicating means includes a low frequency band filter and an indicating instrument responsive to the variations in the total output current whereby the indications are caused to vary as a function of the changes in field strength.

THADDEUS SLONCZEWSKI.

REFERENCES CITED

The following references are of record in the file of this patent:

UNITED STATES PATENTS

| Number | Name | Date |
| --- | --- | --- |
| 2,415,808 | Buckley | Feb. 18, 1947 |